(12) United States Patent
Hodrinsky et al.

(10) Patent No.: US 11,260,289 B2
(45) Date of Patent: Mar. 1, 2022

(54) CLICKER MECHANISM FOR A VIDEO GAME CONTROLLER

(71) Applicants: Todd William Hodrinsky, Mansfield, CT (US); Tyler Scott Hodrinsky, Mansfield, CT (US)

(72) Inventors: Todd William Hodrinsky, Mansfield, CT (US); Tyler Scott Hodrinsky, Mansfield, CT (US)

( * ) Notice: Subject to any disclaimer, the term of this patent is extended or adjusted under 35 U.S.C. 154(b) by 45 days.

(21) Appl. No.: 16/852,917

(22) Filed: Apr. 20, 2020

(65) Prior Publication Data

US 2020/0330858 A1    Oct. 22, 2020

Related U.S. Application Data

(60) Provisional application No. 62/836,407, filed on Apr. 19, 2019.

(51) Int. Cl.
*A63F 13/24*    (2014.01)
*A63F 13/98*    (2014.01)

(52) U.S. Cl.
CPC ............ *A63F 13/24* (2014.09); *A63F 13/98* (2014.09)

(58) Field of Classification Search
CPC ... A63F 13/24; A63F 2300/1043; A63F 13/98
See application file for complete search history.

(56) References Cited

U.S. PATENT DOCUMENTS

| | | | | |
|---|---|---|---|---|
| 6,191,774 B1* | 2/2001 | Schena | ................... | G01B 5/008 345/163 |
| 10,775,125 B1* | 9/2020 | Owen, Jr | ................ | F41A 33/00 |
| 10,857,454 B2* | 12/2020 | Burgess | ................... | A63F 13/24 |
| 2010/0298053 A1* | 11/2010 | Kotkin | ................. | A63F 13/24 463/37 |
| 2012/0244944 A1* | 9/2012 | Kotkin | ................... | A63F 13/24 463/38 |
| 2015/0072790 A1* | 3/2015 | Kotkin | ................... | A63F 13/837 463/38 |
| 2020/0016484 A1* | 1/2020 | Guerrero, Jr. | ............ | G05G 5/06 |

FOREIGN PATENT DOCUMENTS

CA        2932358 A1 * 12/2016 ............. A63F 13/98

* cited by examiner

*Primary Examiner* — James S. McClellan
*Assistant Examiner* — Peter J Iannuzzi
(74) *Attorney, Agent, or Firm* — Wiggin and Dana LLP; Brian A. Pattengale (57) ABSTRACT

A clicker mechanism for a game controller is disclosed. The clicker mechanism comprises a taper-shaped member and a barrel. A screw member is threadably affixed at a top portion of the taper-shaped member for adjusting the pull distance. The barrel is removably extends from a bottom portion of the taper-shaped member. A cam is disposed at an inner portion of the taper-shaped member with snaps at one end and a cam stopper pin at another end. A clicker connects to a bottom portion of the taper-shaped member, wherein the clicker is pressed downwards to create a rotational force on the cam which locks the snaps to the screw member to hold the adjustable levers in position, and wherein the clicker is released to create a rotational force on the cam which unlocks the snaps from the screw member and allows movement of the adjustable levers.

20 Claims, 9 Drawing Sheets

CLICKER MECHANISM FOR A VIDEO GAME CONTROLLER

CROSS-REFERENCE TO RELATED APPLICATION

This application claims priority to U.S. Provisional Patent Application No. 62/836,407, titled "CLICKER MECHANISM FOR A VIDEO GAME CONTROLLER" filed on Apr. 19, 2019. The specification of the above referenced patent application is incorporated herein by reference in its entirety

FIELD OF THE INVENTION

The present invention generally relates to a clicker mechanism for a controller. More specifically, the present invention relates to a clicker mechanism to operate one or more buttons of the controller with detachable levers for maximum control over the operation of the video game.

BACKGROUND

There are various types of gaming consoles available for operating a video game. However, the gaming market has witnessed a very limited number of inventions aiming to solve the issue of the inability of differently-abled gamers to operate physical controllers, which are uniformly designed for the general mass and often ignore the special requirements of the said class of gamers. Additionally, even able-bodied gamers often face challenges in the trigger control because of inadequate accessibility of the trigger controls that results in a disadvantage in video games requiring player input.

Most known game controllers include a type of actuator system for controlling the functions of the video games. Actions in video games such as attacking, firing and the like involve the use of manually operable devices like actuators among others. Such buttons or actuators are referred to as triggers.

The ever-expanding gaming industry and the resultant improvement of games demanding player inputs, gaming circumstances often make it desirable for players to have customizable controllers to gain increased control over their game. However, the existing controllers have not met the requirement of easily accessing small buttons on the controller, thereby hindering the smooth operation of the game and causing a disadvantage in video games. Further, the limitations of the human hand require the user to release some buttons or keys to actuate others. This diminishes the player's potential to control the game to the best of the user's ability. Often during a game, a trigger is pushed much further inwards than needed thereby wasting movement of the fingers and thus increasing reaction time.

In order to mitigate the above-mentioned issues existing in controllers of the prior art, there is a need to provide a clicker mechanism for making the buttons of the controller more accessible to the user with the use of detachable levers and allows maximum control over the operation of the video game. There is also a need to provide a clicker mechanism for the controller with a controller interface consisting of external trigger control that allows faster response time. The clicker mechanism is configured to increase control in a myriad of gaming situations and makes it possible for differently abled gamers to customize their controller to their best advantage.

SUMMARY OF THE INVENTION

The present invention comprises of a clicker mechanism to operate one or more buttons of the controller with detachable levers for maximum control over the operation of the video game.

In one embodiment, the clicker mechanism is securely affixed to adjustable levers of the housing unit on both sides of a game controller or joystick via attaching members. In one embodiment, the housing unit is securely mounted on a game controller or joystick along the respective position of one or more detachable and customizable levers in reference to the buttons and triggers of the game controller. In one embodiment, the clicker mechanism is configured to make the buttons and triggers of the game controller more accessible to a user with the use of detachable levers. In one embodiment, the clicker mechanism is further configured to prevent accidental activation of the levers or arms by the user while playing.

In one embodiment, the clicker mechanism further configured to prevent excessive motion of the user's fingers while using the game controller. In one embodiment, the clicker mechanism comprises a taper-shaped member. The taper-shaped member is securely affixed to the lever of the housing unit of the game controller. In one embodiment, a screw member is movably and threadably affixed at a top portion of the taper-shaped member. The screw member is configured to move outward and inward from the taper-shaped member. In one embodiment, the clicker mechanism further comprises a barrel with a stopper pin. In one embodiment, the taper-shaped member includes arm guides. The barrel comprises one or more fixed ribs. The arm guides prevent the barrel from deflecting left to right or in the x-axis, so the levers or triggers do not slip off buttons of the game controller. The barrel is removably positioned into the taper-shaped member from a bottom portion. The stopper pin is affixed to a top portion of the barrel and configured to move along an opening of the taper-shaped member. In one embodiment, the clicker mechanism further comprises a cam and a cam stopper pin. The cam is moulded and positioned in an inner portion of the barrel. The ribs are configured to allow the barrel to rotate and lock the cam. In one embodiment, the cam includes snaps at one end and a cam stopper pin at another end. The cam stopper pin is configured to stop the cam from moving out of the barrel. In one embodiment, the clicker mechanism further comprises a clicker slidably positioned into the barrel. The clicker is configured to enable the cam to move inward and outward from the barrel.

In one embodiment, the user could activate the clicker mechanism to make the buttons and triggers of the game controller more accessible for the user with the use of customizable levers. In one embodiment, the user could adjust the pull distance by rotating the screw members outwards and inwards from the taper-shaped member. When the user clicks or presses the clicker, it creates a rotational force on the cam which locks the snap to the screw member to hold the adjustable levers in position, and wherein the clicker is released to create a rotational force on the cam which unlocks the snap from the screw member and allows movement of the adjustable levers. The cam stopper pin prevents the cam from moving out of the barrel. The user could easily access the buttons on the game controller using the clicker mechanism and allows maximum control over the operation of the video game. The clicker mechanism allows the user to respond quickly within less time, increase control in a myriad of gaming situations and enables differently-abled gamers to customize their controller to their best advantage.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
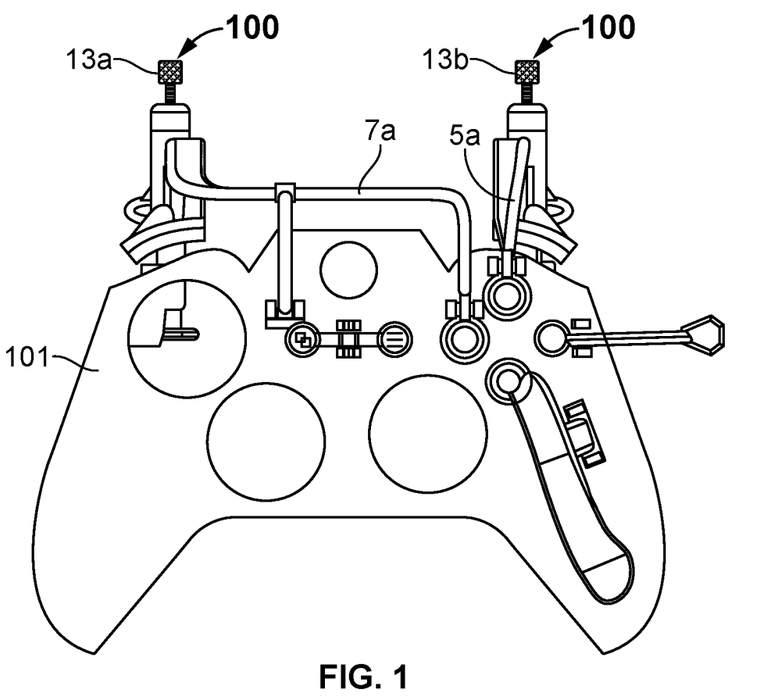
FIG. 1 shows atop perspective view of a clicker mechanism securely positioned to a game controller, according to an embodiment of the present invention.

Referring to FIG. 1, a clicker mechanism 100 customizably fastened to a housing unit is disclosed. In one embodiment, the clicker mechanism 100 is securely affixed to adjustable levers (5a and 7a) of the housing unit 101 on both sides of a game controller or joystick 120 via attaching members 112 (shown in FIG. 3). In one embodiment, the housing unit 101 is securely mounted on a game controller or joystick 120 along with the respective position of one or more detachable and customizable levers (5a and 7a) in reference to the buttons and triggers of the game controller 120. In one embodiment, the clicker mechanism 100 is configured to make the buttons and triggers of the game controller 120 more accessible for a user with the use of detachable levers (5a and 7a). In one embodiment, the clicker mechanism 100 is further configured to prevent accidental activation of the levers or arms (5a and 7a) by the user while playing.

Figure 2:
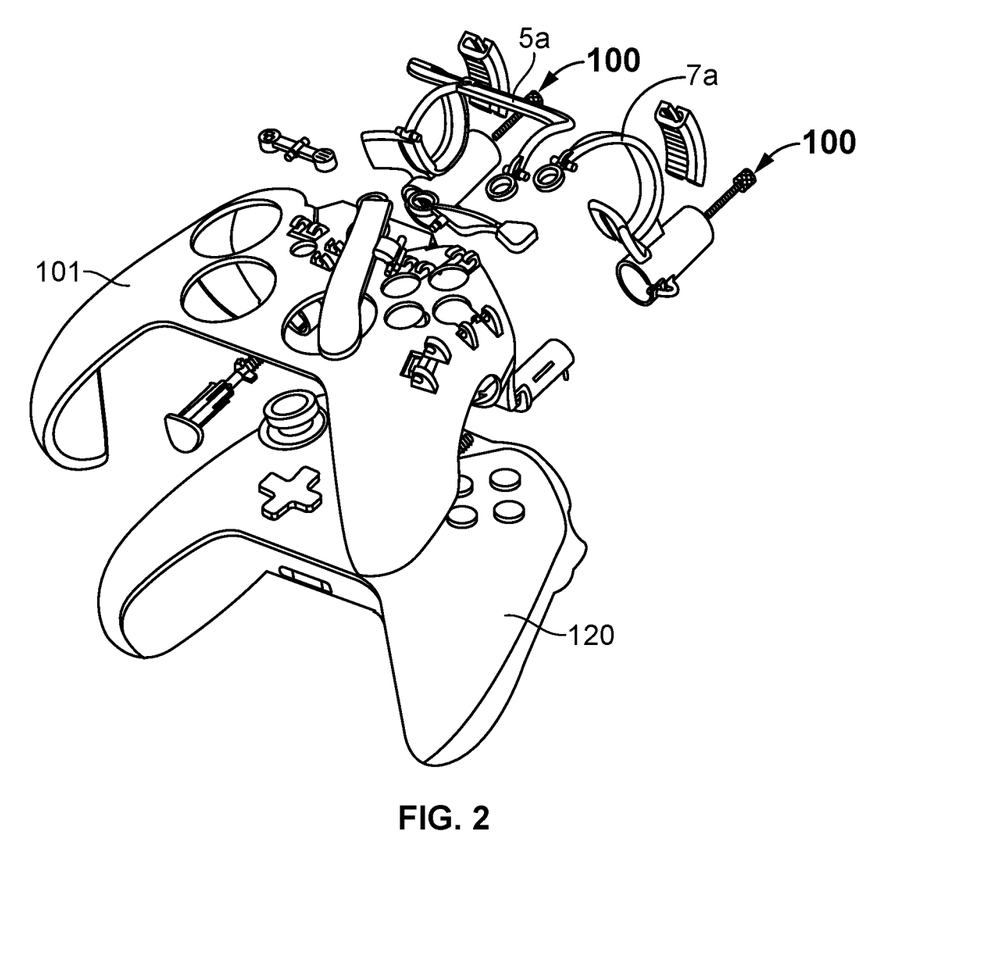
FIG. 2 shows an exploded view of the clicker mechanism, according to one embodiment of the present invention.

Referring to FIG. 2, the customizable levers (5a and 7a) are configured to secured to the housing unit 101 of the clicker mechanism 100 is disclosed. In one embodiment, the housing unit 101 is configured to securely affix to the game controller 120. In one embodiment, the housing unit 101 is made of a material, but not limited to, plastic. In one embodiment, the housing unit 101 is further configured to securely receive the clicker mechanism 100 on both sides to enable the user for simply and quickly accessing the buttons and triggers of the game controller 120 with the use of detachable levers (5a and 7a). In one embodiment, the clicker mechanism 100 is made of a material, but not limited to, plastic.

Figure 3:
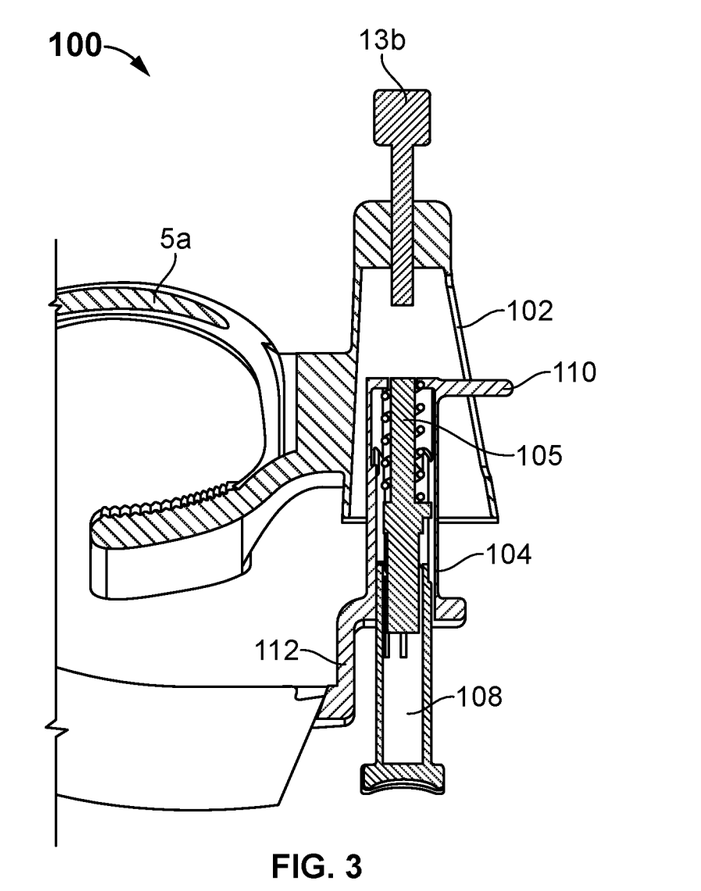
FIG. 3 shows a cross-sectional view of the clicker mechanism, according to an embodiment of the present invention.

Referring to FIG. 3, the clicker mechanism 100 further configured to prevent excessive motion of the user's fingers while using the game controller 120. In one embodiment, the clicker mechanism 100 is securely affixed to housing unit 101 via the attaching member 112. In one embodiment, the clicker mechanism 100 comprises a taper-shaped member or tapered member 102. The taper-shaped member 102 is securely affixed to the lever 5a of the housing unit 101 of the game controller 120. In one embodiment, a screw member 13b is movably and threadably affixed at a top portion of the taper-shaped member 102. The screw member 13b is configured to move outward and inward from the taper-shaped member 102. In one embodiment, the clicker mechanism 100 further comprises a barrel with fixed internal ribs 104 with a stopper pin 110. In one embodiment, the taper-shaped member 102 includes arm guides. The arm guides prevent the barrel 104 from deflecting left to right or in the x-axis so the levers or triggers (5a and 7a) do not slip off the buttons of the game controller 120. The barrel 104 is removably positioned into the taper-shaped member 102 from a bottom portion. The stopper pin 110 is affixed to a top portion of the barrel 104 and configured to move along an opening 118 (shown in FIG. 8) of the taper-shaped member 102. In one embodiment, the clicker mechanism 100 further comprises a cam and a cam stopper pin 105, which is moulded and positioned in an inner portion of the barrel 104. In one embodiment, the clicker 108 includes snaps at one end and a cam stopper pin 105 at another end. The cam stopper pin 105 is configured to stop the cam 105 from moving out of the barrel 104. In one embodiment, the clicker mechanism 100 further comprises a clicker 108, slidably positioned into the barrel 104. The clicker 108 is configured to enable the cam stopper pin 105 to move inward and outward from the barrel 104.

Figure 4:
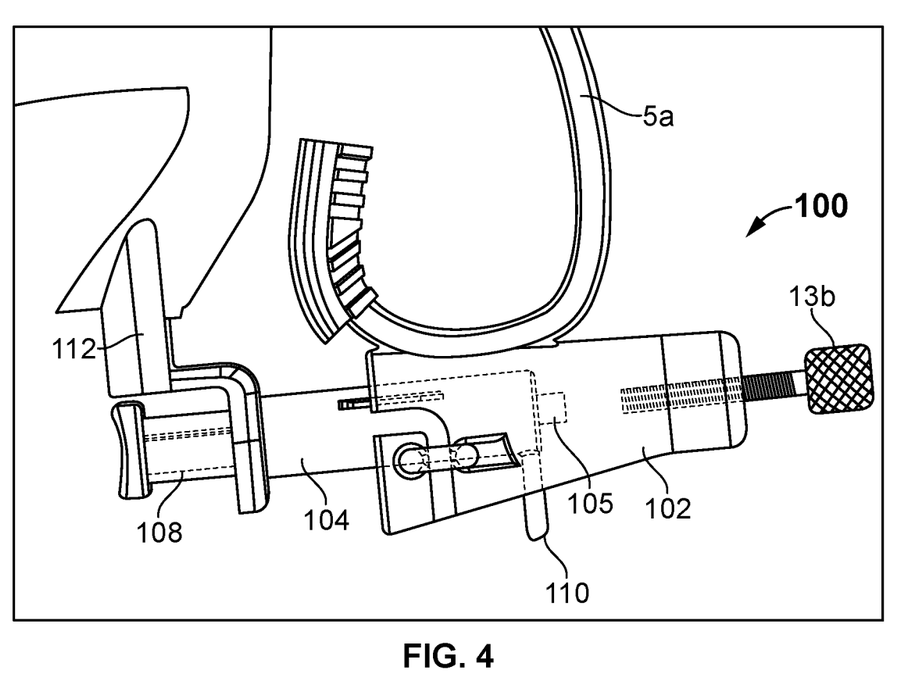
FIG. 4 shows a side view of the clicker mechanism, according to an embodiment of the present invention.

Referring to FIG. 4, the clicker mechanism 100 is activated via the clicker 108 is disclosed. In one embodiment, the user could activate the clicker mechanism 100 to make the buttons and triggers of the game controller 120 (shown in FIG. 2) more accessible for the user with the use of customizable levers (5a and 7a). In one embodiment, the user could adjust the pull distance by rotating the screw members 13b outwards and inwards from the taper-shaped member 102. When the user clicks or presses the clicker 108 with fingers, it creates a rotational force on the cam 105 which locks the snap to the screw member 13b to hold the adjustable levers (5a and 7a) in position, wherein the clicker 108 is released to create a rotational force on the cam 105 which unlocks the snap from the screw member 13b and allows movement of the adjustable levers (5a and 7a). The cam stopper pin 105 prevents the cam 104 from moving out of the barrel 104. The user could easily access the buttons on the game controller 120 using the clicker mechanism 100 and allows maximum control over the operation of the video game. The clicker mechanism 100 allows the user to respond quickly within less time and shortens the reaction in the game for leading to increase control in a myriad of gaming situations and also makes it possible for differently-abled gamers to customize their controller to their best advantage.

Figure 5:
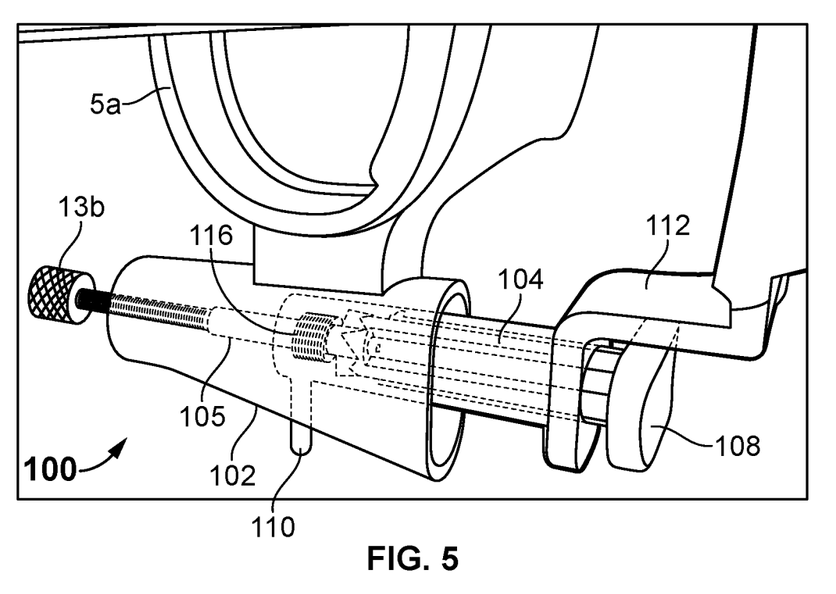
FIG. 5 shows an upper perspective view of the clicker mechanism, according to an embodiment of the present invention.

Referring to FIG. 5, the arrangement and operation of the clicker mechanism 100 on turning on the clicker 108 is disclosed. In one embodiment, the clicker mechanism 100 further comprises a spring 116, which is connected to the cam 105. When the clicker 108 is pressed, the spring 116 inside the taper-shaped member 102 is compressed and the cam stopper pin 105 is connected to the screw 13b. This mechanism locks the lever 5a in position and prevents any movement of lever 5a on exertion of external force. This in turn fully extends the screw 13b in communication with the cam stopper pin 105, providing zero pull. To adjust or add the pull distance, the screw members 13b is rotated outwards or inwards by the user.

Figure 6:
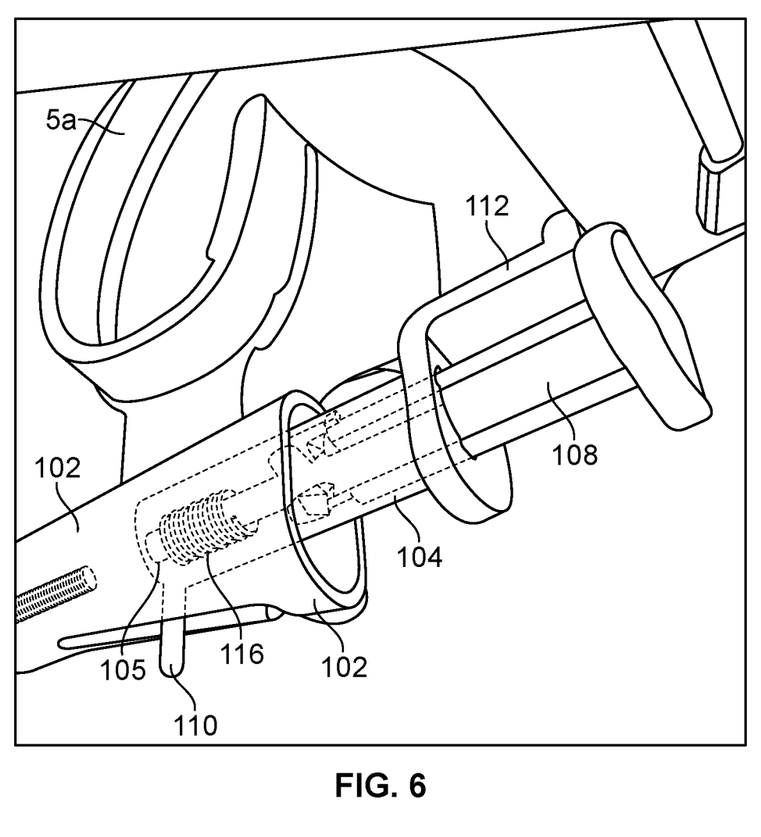
FIG. 6 shows a side perspective view of the clicker mechanism, according to an embodiment of the present invention.

Referring FIG. 6, the cam stopper pin 105 could be released on pressing the clicker 108 again. This action compresses the spring 116 even more, which rotates the cam stopper pin 105 to a second position. Then, the cam stopper pin 105 slides to the right and allows full stroke from 0 starting point without coming in contact with the screw 13b.

Figure 7:
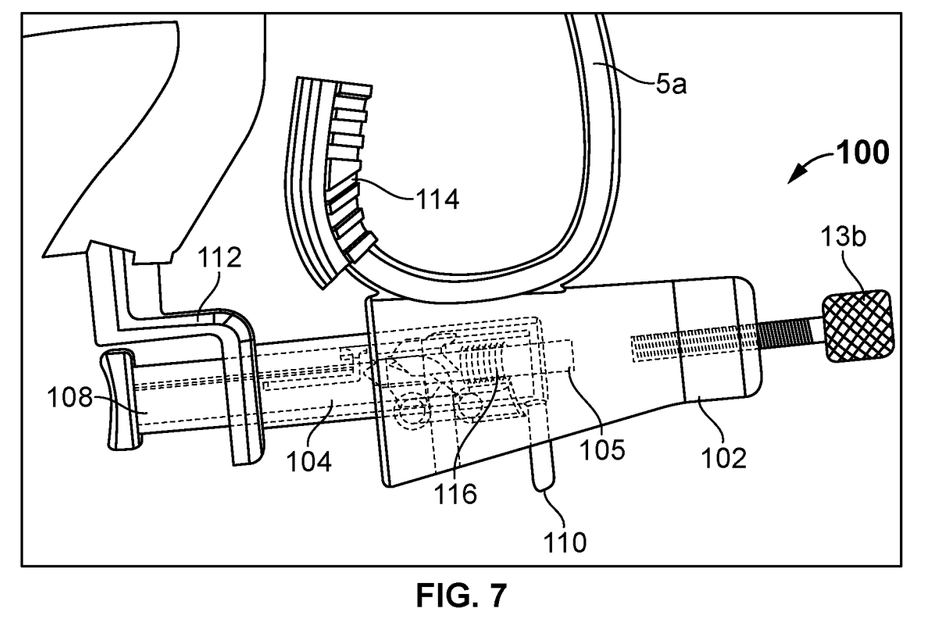
FIG. 7 illustrates a screw member released from a cam, according to an embodiment of the present invention.

Referring FIG. 7, the adjustable screw 13b is adjusted to a specific distance for limiting the pull distance. In one embodiment, the screw adjustment point is adjustable using trigger pull adjustment screw 13b. When the adjustable screw 13b hits the cam stopper pin 105, it stops the clicker/trigger from being fully pulled to the left. The trigger pad 114 provided at the distal end of the arm 5a, touches the arm guide 104 and retains till unlocking the cam stopper pin 105. During unlocking, the flat surface of the clicker 108 is again pressed, which compresses the spring again, thereby enabling the cam stopper pin 105 to retract inside the barrel 104 and arm guide. The movement of cam stopper pin 105 inside the barrel 104 and arm guide allows for full stroke during gameplay. In one embodiment, the user has the option to click the clicker 108 again for extending the cam stopper pin 105 to lock. In one embodiment, the clicker mechanism 100 is turned on or off during gameplay to provide full stroke or limited stroke.

In one embodiment, the stopper pin 110 is configured to prevent the arm/taper-shaped member 102 from leaving the barrel guide 104. In one embodiment, the arm 102 fits tightly in the x-axis, which prevents slipping off of arms 102 from the triggers. In another embodiment, the shape of the arm 102 allows for radial motion without any binding. In another embodiment, the arm 102 hits stopper pin 110 at its extended position, thereby preventing the arm 102 from leaving the arm guide 104.

When the cam stopper pin 105 is released, a space is created between the screw member 13b and the cam stopper pin 105, which activates the adjustable lever 5a that could be pulled to the left to activate the trigger or button of the game controller 120 (shown in FIG. 2). In one embodiment, the force created by the spring 116 is a torsional force or rotational force. In one embodiment, the spring 116 is a torsion spring.

Figure 8:
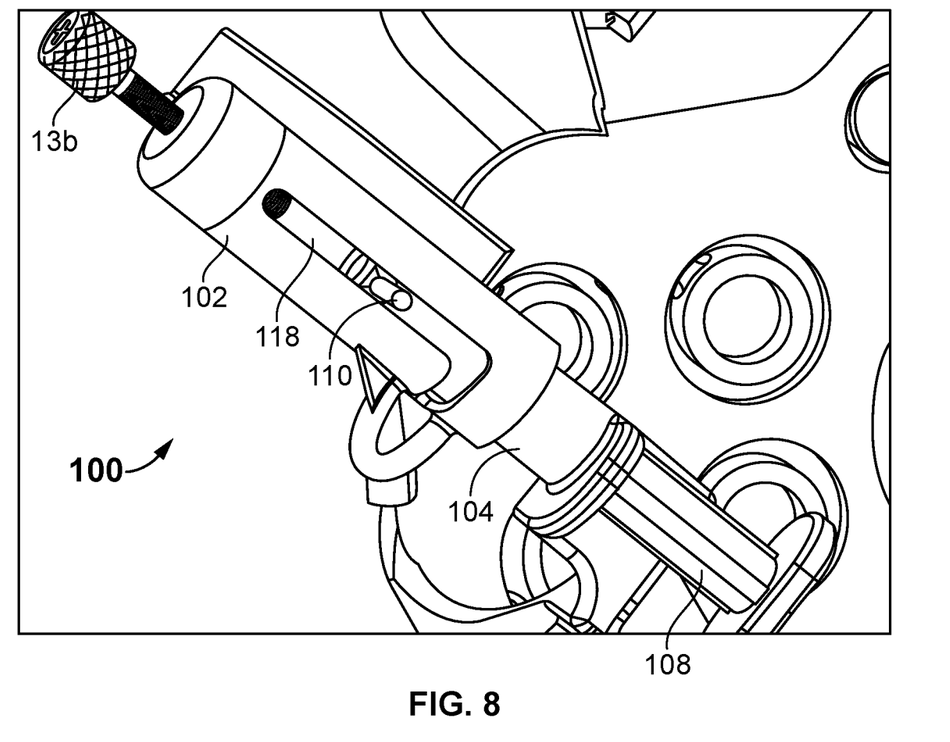
FIG. 8 shows a stopper pin of the clicker mechanism, according to an embodiment of the present invention.

Referring to FIG. 8, a locking pin or stopper pin 110 is configured to prevent the exit of barrel 104 from the taper-shaped member or arm 102 is disclosed. In one embodiment, a loop of material/guide is provided to prevent the arm 102 from breaking and flexing as it pushed forward and/or backward. In one embodiment, a radial cut 118 is provided in the arms 102 that allows the arms to be easily inserted within the clicker mechanism 100. The arms 102 could be replaced by the user. In one embodiment, the stopper pin 110 is affixed to a bottom portion of the barrel 104 and is configured to move along the opening 118. In one embodiment, the stopper pin 110 could rotate about 90 degrees along the opening 118 on the wall of the arm 102. In one embodiment, the opening 118 is in L-shaped structure. The arm 102 is made of material including, but not limited to steel, plastic or any suitable material.

Figure 9:
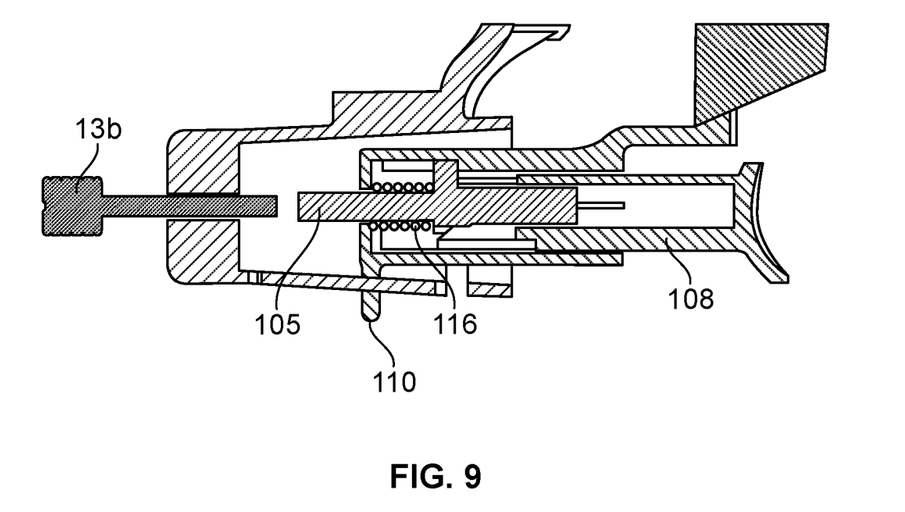
FIG. 9 shows a detailed view of the clicker mechanism, according to an embodiment of the present invention.

Referring to FIG. 9 shows a detailed view of the clicker mechanism 100, according to an embodiment of the present invention. The clicker 108 is configured to press downwards to create a rotational force on the cam 105 which locks the snap of the cam 105 to the screw member for holding the lever in position via the spring 116. When the clicker 108 is released, it creates a rotational force on the cam which unlocks the snap from the screw member and allows movement of the lever 5a via the spring 116, thereby enabling the user to trigger at least one button of the video game controller 120 (shown in FIG. 2). When the clicker 108 is pressed, the spring 116 inside the taper-shaped member 102 is compressed and the cam stopper pin 105 is connected to the screw 13b. This mechanism locks the lever 5a in position and prevents any movement of lever 5a on exertion of external force. This in turn fully extends the screw 13b in communication with the cam stopper pin 105, providing zero pull. To adjust or add the pull distance, the screw members 13b is rotated outwards or inwards by the user.

The advantages of the present invention include: the clicker mechanism 100 is configured to prevent excessive motion of the user's fingers. This reduces reaction time for other moves. The clicker mechanism 100 is minutely adjusted to fine tune the required pull distance to activate the game function on the screen. The clicker mechanism 100 allows incremental control of the triggers suited to the custom needs of the user while playing with game controllers.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A clicker mechanism for a video game controller, comprising:

one or more levers, each of the one or more levers configured to trigger at least one button of the video game controller by a user;
a tapered member connected to the one or more levers;
a screw member disposed at a top portion of the tapered member;
a cam disposed at an inner portion of the tapered member, wherein the cam comprises a snap at one end and a cam stopper pin at another end;
a spring securely and operatively coupled to the cam, and
a clicker connected to a bottom portion of the tapered member, wherein the clicker is configured to press downwards to create a rotational force on the cam which locks the snap to the screw member to hold the one or more levers in position, and wherein the clicker is released to create a rotational force on the cam which unlocks the snap from the screw member and allows movement of the one or more levers, thereby enabling the user to trigger the at least one button of the video game controller.

2. The clicker mechanism of claim 1, wherein the clicker is connected to the tapered member via a barrel.

3. The clicker mechanism of claim 2, wherein the barrel comprises one or more fixed ribs, which are configured to allow the barrel to rotate and lock the cam.

4. The clicker mechanism of claim 1, further comprising a stopper pin affixed at a top portion of the barrel, wherein the stopper pin is configured to move along an opening of the tapered member.

5. The clicker mechanism of claim 1, wherein the screw member is threadably disposed at the top portion of the tapered member.

6. The clicker mechanism of claim 1, wherein the cam stopper pin is configured to stop the cam from moving out of the barrel.

7. The clicker mechanism of claim 1, wherein the clicker is configured to enable the cam to move inward and outward from the barrel.

8. The clicker mechanism of claim 1, wherein the screw member is configured to prevent excessive motion of a user's fingers while using the game controller by limiting the pull distance.

9. The clicker mechanism of claim 1, wherein at least the tapered member is made of plastic.

10. A system comprising:
a housing unit configured for attachment to a video game controller;
one or more clicker mechanisms according to claim 1 disposed on the housing unit;
one or more paddles disposed on the housing unit each configured to actuate one or more buttons of the video game controller.

11. The system of claim 10 further comprising a rocker to actuate two buttons of the video game controller alternately.

12. A clicker mechanism for a video game controller, comprising:
a lever configured to enable a user to trigger at least one button of the video game controller,
a tapered member connected to the lever, wherein the tapered member is configured to secure to a housing unit;
a screw member threadably disposed at a top portion of the tapered member;
a cam disposed at an inner portion of the tapered member via a barrel, wherein the cam comprises a snap at one end and a cam stopper pin at another end;
a spring operatively coupled to the cam, and
a clicker connected to a bottom portion of the tapered member, wherein the clicker is configured to press downwards to create a rotational force on the cam which locks the snap of the cam to the screw member for holding the lever in position, and wherein the clicker is released to create a rotational force on the cam which unlocks the snap from the screw member and allows movement of the lever, thereby enabling the user to trigger the at least one button of the video game controller.

13. The clicker mechanism of claim 12, further comprises a stopper pin affixed at a top portion of the barrel, wherein the stopper pin is configured to move along an opening of the tapered member.

14. The clicker mechanism of claim 12, wherein the barrel comprises one or more fixed ribs, which are configured to allow the barrel to rotate and lock the cam.

15. The clicker mechanism of claim 12, wherein the cam stopper pin is configured to stop the cam from moving out of the barrel.

16. The clicker mechanism of claim 12, wherein the clicker is configured to enable the cam to move inward and outward from the barrel.

17. The clicker mechanism of claim 12, wherein the screw member is configured to prevent excessive motion of a user's fingers while using the game controller by limiting the pull distance.

18. The clicker mechanism of claim 12, wherein at least the tapered member is made of plastic.

19. A system comprising:
a housing unit configured for attachment to a video game controller;
one or more clicker mechanisms according to claim 12 disposed on the housing unit;
one or more paddles disposed on the housing unit each configured to actuate one or more buttons of the video game controller.

20. The system of claim 19 further comprising a rocker to actuate two buttons of the video game controller alternately.

* * * * *